United States Patent [19]

Buecheler

[11] 4,417,014
[45] Nov. 22, 1983

[54] PHTHALOPERINONE DYES AND THE USE THEREOF FOR MORE DYEING PLASTICS

[75] Inventor: Paul Buecheler, Reinach, Switzerland

[73] Assignee: Sandoz Ltd., Basel, Switzerland

[21] Appl. No.: 409,112

[22] Filed: Aug. 18, 1982

Related U.S. Application Data

[63] Continuation of Ser. No. 198,625, Oct. 20, 1980, abandoned.

[30] Foreign Application Priority Data

Oct. 25, 1979 [CH] Switzerland .......................... 9590/79

[51] Int. Cl.³ ..................... C09B 57/12; C07D 487/22
[52] U.S. Cl. ........................................ 524/90; 544/245
[58] Field of Search ........................... 544/245; 524/90

[56] References Cited

U.S. PATENT DOCUMENTS 3,410,821 11/1968 Cooper et al. ......................... 524/90
4,024,144 5/1977 Groll et al. ........................... 544/245

FOREIGN PATENT DOCUMENTS 1166701 11/1958 France .
512552 10/1971 Switzerland .
1062368 3/1967 United Kingdom .
1242905 8/1971 United Kingdom .
1363131 8/1974 United Kingdom .
1445049 8/1976 United Kingdom .

Primary Examiner—Diana G. Rivers
Attorney, Agent, or Firm—Gerald D. Sharkin; Richard E. Vila; Thomas C. Doyle

[57] ABSTRACT

The present invention provides dyestuffs of formula I,

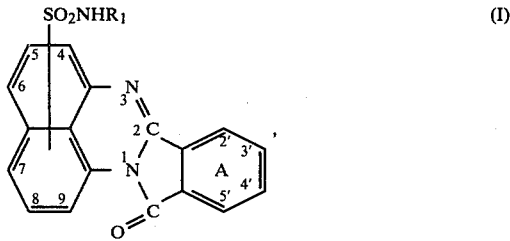

in which $R_1$ is a mono- or bicyclic aromatic radical, and the ring A may bear up to 4 substituents conventional for dyestuffs, in which the dyestuff is free from sulphonic and carboxylic acid groups, and mixtures of such dyestuffs and their use as disperse dyestuffs.

22 Claims, No Drawings

PHTHALOPERINONE DYES AND THE USE THEREOF FOR MORE DYEING PLASTICS

This is a continuation of application Ser. No. 198,625 filed Oct. 20, 1980 and now abandoned.

The present invention relates to phthaloperinone compounds, their production and use as dyestuffs.

More particularly, the present invention provides dyestuffs of formula I,

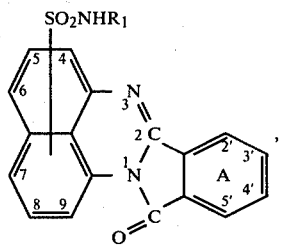
(I)

in which $R_1$ is a mono- or bicyclic aromatic radical, and the ring A may bear up to 4 substituents conventional for dyestuffs, in which the dyestuff is free from sulphonic and carboxylic acid groups, and mixtures of such dyestuffs.

$R_1$ is preferably $R_1'$, where $R_1'$ is naphthyl or phenyl which phenyl is optionally substituted by up to two substituents selected from the group consisting of chlorine, bromine, methyl, methoxy, ethoxy, alkoxy, carbonyl (up to two of each of these), nitro, cyano and aminocarbonyl (only one of any of these).

More preferably, $R_1$ is $R_1''$, where $R_1''$ is phenyl optionally substituted by up to two substituents selected from the group consisting of chlorine, methyl, methoxy, ethoxy (up to two of each of these) aminocarbonyl and nitro (only one of any of these). More preferably, $R_1$ is $R_1'''$, where $R_1'''$ is phenyl optionally substituted by up to two substituents selected from the group consisting of methyl, methoxy, ethoxy and aminocarbonyl (only one of the latter).

The ring A is preferably A', where the ring A' is unsubstituted or is substituted by up to four substituents selected from chlorine, bromine and nitro (only 1 nitro group). More preferably the ring A is A", where the ring A" is unsubstituted or substituted by up to 4 chlorine atoms. Most preferably the ring A is A''', where the ring A''' is unsubstituted or is substituted by two or four chlorine atoms.

Thus preferred compounds and mixtures according to the invention are those of formula I in which $R_1$ and $R_1'$ and the ring A is A'. More preferred compounds are those where $R_1$ is $R_1''$ and A is A", especially those compounds and mixtures where the $SO_2NHR_1$ group is in the 4- and/or 6-position.

The present invention also provides a process for the production of compounds of formula I, comprising condensing a compound of formula II

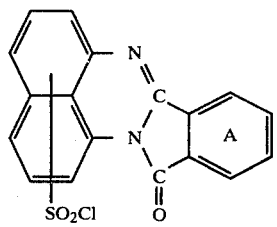
(II)

or a mixture thereof with an amine of formula III $$R_1-NH_2 \quad (III)$$

The condensation reaction is effected in accordance with known methods. The compounds of formula II and III are either known or are prepared in accordance with known methods from available starting materials. When the compounds of formula II are prepared by sulphochlorination of the corresponding phthaloperinones a mixture of isomers is obtained, the predominant isomers being those where the sulphonylchloride group is in the 4- and 6-positions. If pure compounds of formula II are desired, the isomers can be separated, however, in general for commercial purposes no separation step would be carried out. Thus, the present invention primarily provides mixtures of compounds of formula I. Further, when the ring A bears up to three substituents, that is when the compound of formula II is produced from the correspondingly substituted phthalic acid anhydride and 1,8-diaminonaphthalene, the compound of formula II and hence the compound of formula I will be obtained as a multiple isomeric mixture.

The dyestuffs of formula I and mixtures thereof are useful primarily for spin dyeing plastics in the mass, especially linear, aromatic polyesters. Such polyesters are polycondensates of terephthalic acid, and optionally isophthalic acid, with ethylene glycol and/or cyclohexane-diol. Dyeing in the mass is carried out in accordance with known methods.

The preferred method of producing the mass-dyed polyester is first to mix the dyestuff, suitably after having been purified and/or ground with a saturated linear, aromatic polyester to form a concentrate or so-called "master-batch." Generally such master-batch contains from 10 to 50 percent by weight of dyestuff and 50 to 90 percent by weight polyester. This master-batch is then added in molten form, in the desired amount, depending on the depth of dyeing desired, to the molten high molecular weight polyester and distributed throughout the melt. The preparation of the master-batch is suitably effected by grinding together to form a fine powder and, optionally processing the powder through an extruder to form chippings or granulates. The polyester for the master-batch formation may be one which has a low melting point i.e. a melting point in the range of from 75° C. to 230° C. and a softening point in the range of from 60° C. to 80° C.

After addition of the master batch to the high-molecular weight polyester, the resulting mix can be formed into shaped articles, such as films, foils, fibres or filaments in conventional manner, e.g. by extrusion or spinning and such articles further processed, e.g. into yarn, cord, rope, woven, non-woven and knitted goods, or the mix can be formed into granules or chippings for subsequent melting and formation into such shaped articles.

The dyestuffs as well as being employable for the mass dyeing of polyester by the method described above, may also be incorporated into the polyester by co-condensation with the polymer precursors.

The dyestuffs of formula I dissolve in the polymer melt and remain in the same dissolved form after cooling of the melt.

The dyeings obtained have good fastnesses, especially to light, migration, gas-fumes, ozone and sublimation as well as notable wet-fastnesses. Of particular interest is the stability of the compounds of formula I during the processing of the polyesters e.g. extrusion and exposure to heat.

The following Examples further serve to illustrate the invention. In the Examples all parts are by weight and all temperatures in degrees centigrade.

EXAMPLE 1

54 Parts phthaloperinone are added at 22° to 26° with stirring to 385 parts chlorosulphonic acid. The reaction mixture is stirred for 1 hour at this temperature and then poured onto 700 parts ice. The temperature of the precipitate is kept at 0° with ice. The suspension is subsequently filtered, the residue washed with a mixture containing 1000 parts ice, 1000 parts water and 30 parts 30% aqueous hydrochloric acid and added, with rapid stirring, to a mixture of 400 parts ice, 100 parts water and 23 parts aniline. Cooling is effected to keep the temperature at 1° to 3°. The pH of the reaction mixture is 5.3 and is raised to 7.1 by the addition of 30% aqueous sodium hydroxide. Over a period of 2 hours the temperature is allowed to rise to 25° and stirring is effected at this temperature for 4 hours. The precipitate is suction filtered, washed with water and dried at 100°. 77 Parts of product of formula I in which $R_1$ is phenyl and the ring A is unsubstituted are obtained. The product is predominantly (96%) a mixture of the two isomers, one where $SO_2NHR_1$ is bound to the 6-position and one where such group is bound to the 4-position. The product dyes linear, aromatic polyesters in the mass in golden-yellow shades.

Instead of neutralizing with 30% aqueous sodium hydroxide, $NaHCO_3$ or $Na_2CO_3$ can advantageously be employed.

EXAMPLE 2

In analogous manner to the procedure described in Example 1, a dyestuff is prepared from the dichlorophthaloperinone mixture (which has been prepared from 1,8-diaminonaphthalene and 3,4-dichlorophthalic acid anhydride) by sulphochlorinating the phthaloperinone and condensing with aniline. The product essentially comprises 4 isomers, one where the $SO_2NHR_1$ group is in the 4-position and the 2'- and 3'-positions of ring A bear chlorine atoms, one where the $SO_2NHR_1$ is in the same position and the 4'- and 5'-positions of the ring A bear chlorine atoms, one where the $SO_2NHR_1$ group is in the 6-position and the chlorine atoms are in the 2'- and 3'-position and the last where the $SO_2NHR_1$ group is in the same position and the chlorine atoms are in the 4'- and 5'-positions.

The dyes in the following Table 1 are prepared in analogous manner to the procedure described in Example 1. They correspond to formula I wherein the ring A is unsubstituted, $R_1$ is a phenyl radical and the substituents thereon are given in the Table. As in the case of the dyestuff of Example 1 a mixture of isomers is obtained, the mixture essentially consists of (96%) the compounds where the $SO_2NHR_1$ group is bound to the 4- and 6-positions.

TABLE 1

| Example No. | Substituent on $R_1$ | Shade of the substance | shade in polyester |
|---|---|---|---|
| 3 | 3,4-dichloro | yellow-orange | yellow |
| 4 | 2-$CH_3$ | yellow-brown | brown |
| 5 | 4-$CH_3$ | ochre-yellow | yellow |
| 6 | 2,5-dimethyl | yellow | " |
| 7 | 2-$CH_3$—4-Cl | orange-yellow | " |
| 8 | 2-$OCH_3$ | yellow-orange | " |
| 9 | 2-$OCH_3$—4-$CH_3$ | orange-yellow | " |
| 10 | 2-$OCH_3$—4-$NO_2$ | ochre-yellow | brown |
| 11 | 3-$CONH_2$ | orange-yellow | yellow |

EXAMPLE 12

26.3 Parts 1,8-diaminonaphthalene and 38 parts of chlorinated phthalic acid anhydride (prepared as described below) are heated to boiling point in 110 parts N-methylpyrrolidone over the period of 1 hour and are kept at this temperature for 1 hour, the reaction-water being distilled off. The mixture is cooled to room temperature and then the mixture, with intensive stirring, is slowly poured onto 1000 parts water, the residue is filtered off and dried. In place of the N-methylpyrrolidone, nitrobenzene or orthodichlorobenzene may also be used.

The chlorination of the phthalic acid is effected in analogy with known methods in water at 45° to 50° by admitting chlorine gas with the pH value being kept at approximately 5 by the addition of aqueous sodium hydroxide. After approximately 10 hours reacting, a mixture containing approximately 63% 4,5-dichlorophthalic acid, 17% 3,4-dichlorophthalic acid, 9% 3,6-dichlorophthalic acid, 6% trichlorophthalic acid and 4% 4-chlorophthalic acid (chromatographic analysis) is obtained. The mixture is heated under low vacuum to approximately 200° to yield the corresponding chlorophthalic acid anhydride. The product is employed as such for the reaction with the 1,8-diaminonaphthalene.

34 Parts of the perinone mixture are added over 30 minutes to 178 parts chlorosulphonic acid and reacted further as described in Example 1. A dyestuff which dyes linear, aromatic polyesters in the mass in yellow-brown shades is obtained.

The dyestuffs in the following Table 2 are prepared in analogous manner. They correspond to formula I wherein $R_1$ is unsubstituted phenyl and also predominantly consist of the 4- and 6-position isomers.

TABLE 2

| Example No. | Substituents on A | Shade on polyester |
|---|---|---|
| 13 | 3',4'-dichloro | orange |
| 14 | mixture of 3'- and 4'-chloro | yellow-brown |
| 15 | 2',3',4',5'-tetrachloro | brown-red |
| 16 | 2',3',4',5'-tetrabromo | " |
| 17 | mixture of 3'- and 4'-nitro | brown |

EXAMPLE 18

In analogy with the method of the preceding Examples 13.5 parts phthaloperinone and 20.4 parts tetrachlorophthaloperinone were sulphochlorinated and condensed with 40 parts aniline. The dyestuff obtained dyes linear, aromatic polyesters in orange shades.

Application Example A

1000 Parts conventional polyester obtained from terephthalic acid and ethylene glycol are ground to a powder in a spin mill, the polyester particles then have a diameter of between 300 and 600μ. This powder is then mixed well with 150 parts dyestuff of Example 1 at room temperature and then processed in an extruder at 130° to form a cable which is then cut to granulate.

The concentrate is melted in the shunt current of a helical spinning machine and is added by a metering device to further such polyester in the primary current of the spinning machine heated to 270° to 275°. The metering device adds 4 parts master batch or concentrate to 48 parts polyethylene terephthalate. The mixture is then spun at 270° to 275° at a winding speed of 200 meters per minute, the spun fibres are then stretched at 90° in a drawing machine in a ratio of 1:4 and are twisted in the usual manner in a ring twister. A yellow mass-dyed yarn with good fastnesses is obtained.

The dyestuffs of Examples 2 to 18 may also be employed in the same manner to obtain dyeings of the shades indicated in those Examples.

Application Example B

1360 Parts of ethylene glycol and 1700 parts dimethyl terephthalate are stirred with 0.55 parts manganese acetate for 3½ hours at 180° and the methanol produced is distilled off.

The mass is then transferred to a vacuum container suitable for polycondensation and a mixture of 80 parts ethylene glycol, 0.45 parts antimony trioxide, 20 parts trinonyl phenyl phosphite and 17 parts of the dyestuff of Example 1 (in powder form) are added thereto. With stirring and successively decreasing vacuum to 1 Torr, the whole is heated to 275° until an intrinsic viscosity of η=0.70 is reached with ethylene glycol being distilled off.

The so-dyed polyester is then extruded into water to cool and is granulated. The granules are vacuum dried at 140° for 16 hours and finally spun, stretched and twisted as described in Example A. A golden-yellow yarn is obtained.

The dyestuffs of Examples 2 to 18 may also be employed in the same manner.

What is claimed is:

1. A compound of the formula

[Chemical structure with SO₂NHR₁ group on naphthalene fused to ring system containing N=C, N-C=O and ring A]

in which
R₁ is unsubstituted naphthyl or phenyl or phenyl substituted by up to two substituents of which up to two are selected from the group consisting of chlorine, bromine, methyl, methoxy, ethoxy and alkoxy $C_{1-2}$ carbonyl and up to one is selected from the group consisting of nitro, cyano and aminocarbonyl, and
the ring A is unsubstituted or substituted by up to four substituents of which up to four are selected from the group consisting of chlorine and bromine and up to one is nitro.

2. A compound according to claim 1, in which $R_1$ is unsubstituted phenyl or phenyl substituted by up to two substituents of which up to two are selected from the group consisting of chlorine, methyl, methoxy and ethoxy and up to one is selected from the group consisting of aminocarbonyl and nitro.

3. A dyestuff according to claim 1, in which $R_1$ is unsubstituted phenyl or phenyl substituted by up to two substituents of which up to two are selected from the group consisting of methyl, methoxy and ethoxy and up to one is aminocarbonyl.

4. A dyestuff according to claim 2 wherein the ring A is unsubstituted or substituted by up to four chlorine atoms.

5. A dyestuff according to claim 3 wherein the ring A is unsubstituted or substituted by 2 or 4 chlorine atoms.

6. A compound according to claim 1 wherein the —SO₂NHR₁ group is in the 4- or 6-position.

7. A compound according to claim 4 wherein the —SO₂NHR₁ group is in the 4- or 6-position.

8. A mixture of compounds according to claim 1.

9. A mixture of compounds according to claim 4.

10. A mixture of compounds according to claim 6.

11. A compound according to claim 1, in which the ring A is unsubstituted or substituted by up to 4 chlorine atoms.

12. A compound according to claim 11, in which the ring A is unsubstituted or is substituted by two or four chlorine atoms.

13. The compound according to claim 12, of formula

[Chemical structure with SO₂NHC₆H₅]

14. The compound according to claim 12, of formula

[Chemical structure with SO₂NHC₆H₅ and two Cl substituents on ring A]

15. The compound according to claim 12, of formula

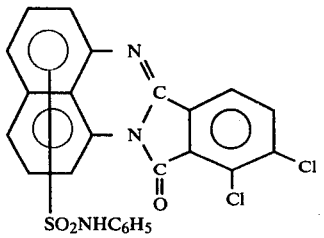

16. A compound according to claim 12, in which the aminosulphonyl group is in the 4-position.

17. A compound according to claim 12, in which the aminosulphonyl group is in the 6-position.

18. A mixture of compounds according to claim 13, in which the SO₂NHC₆H₅ group is in the 4- and 6-position.

19. A mixture of the compounds of claim 14, in which the —SO₂NHC₆H group is in the 4- and 6-position.

20. A process for dyeing linear aromatic polyester which comprises incorporating in a molten mass of said polyester or co-condensing with the precursors of said polyester a compound according to claim 1.

21. A process according to claim 20, wherein the compound is incorporated in a molten mass of the polyester.

22. A process for dyeing linear aromatic polyester which comprises incorporating into a molten mass of said polyester a dyestuff according to claim 4.

* * * * *